(12) United States Patent
Strobel et al.

(10) Patent No.: US 7,614,974 B2
(45) Date of Patent: Nov. 10, 2009

(54) TRANSMISSION FOR VEHICLE STEERING APPARATUS

(75) Inventors: Joseph-Léon Strobel, Mauren (LI); Ralf Gmuender, Appenzell (CH); Robert Galehr, Mauren (LI)

(73) Assignee: ThyssenKrupp Presta AG, Eschen (LI)

( * ) Notice: Subject to any disclaimer, the term of this patent is extended or adjusted under 35 U.S.C. 154(b) by 444 days.

(21) Appl. No.: 11/786,083

(22) Filed: Apr. 10, 2007

(65) Prior Publication Data

US 2008/0242465 A1    Oct. 2, 2008

(30) Foreign Application Priority Data

Mar. 28, 2007    (CH) .................................... 0499/07

(51) Int. Cl.
*F16H 1/32*    (2006.01)

(52) U.S. Cl. ...................... 475/168; 475/174; 475/178

(58) Field of Classification Search ............... 475/174, 475/178, 179
See application file for complete search history.

(56) References Cited

U.S. PATENT DOCUMENTS

| | | | | |
|---|---|---|---|---|
| 3,073,184 | A | * | 1/1963 | Brarern ....................... 475/180 |
| 3,985,047 | A | * | 10/1976 | Therkelsen .................. 254/354 |
| 4,117,746 | A | * | 10/1978 | Pierrat ......................... 475/168 |
| 4,338,831 | A | * | 7/1982 | Rodaway ..................... 475/178 |
| 5,695,425 | A | * | 12/1997 | Hashimoto et al. .......... 475/180 |
| 5,910,065 | A | * | 6/1999 | Weyman et al. ............. 475/207 |
| 2008/0176701 | A1 | * | 7/2008 | Yamamoto et al. .......... 475/178 |
| 2009/0062053 | A1 | * | 3/2009 | Kobayashi ................... 475/166 |

FOREIGN PATENT DOCUMENTS

EP    1645488    10/2005

* cited by examiner

*Primary Examiner*—David D Le
*Assistant Examiner*—Justin Holmes
(74) *Attorney, Agent, or Firm*—Notaro & Michalos P.C.

(57) ABSTRACT

A vehicle steering apparatus having a drive (101) which is coupled to a second shaft (2) with the longitudinal axis (8) via a disk cam mechanism, the disk cam mechanism comprising the following elements:
  at least one disk cam (3, 4) with an undulating outer contour (33, 34) disposed for eccentric rotation about the longitudinal axis (8) and with a central opening (30) around which holes 31 are arranged;
  a first carrier (16), which is arranged on a first shaft (1) and the axis of which lies in the longitudinal axis (8), having driving pins (17) circularly disposed on the carrier and engaging in the holes (31);
  a rotor shaft (6) arranged for coaxial rotation about the first shaft (1) and connected to the drive (101), carrying at least one eccentric (5) with an eccentricity (22) engaging in the central opening (30) of an associated disk cam (3, 4) to produce a rotating, laterally wobbling motion of the at least one disk cam (3, 4);
  a second carrier (18), which is arranged on a second shaft (2) and the axis of which lies in the longitudinal axis (8), having external pins (19) circularly disposed on the carrier, on which the outer contour (33, 34) of the disk cam (3, 4) rolls off.

14 Claims, 10 Drawing Sheets

US 7,614,974 B2

TRANSMISSION FOR VEHICLE STEERING APPARATUS

FIELD AND BACKGROUND OF THE INVENTION

The invention relates to a vehicle steering apparatus for motor vehicles with a drive to support the steering apparatus which is connected to a steering gear via a gear arrangement with an output shaft.

This type of drive with a transmission is used in vehicle steering apparatuses for electric power assisted steering and for rotational speed superimposition devices.

In electric power assisted steering, an electric motor with downstream reduction gear injects a servo force into the steering shaft or the transverse rack of the steering system as a function of the turn of the steering wheel. This reduces the effort required at the steering wheel to steer the vehicle. It is also possible to use electronic control means to provide the assistive power at the right time and based on the desired behavior, for example, a correspondingly greater amount when the vehicle is stationary. Such electric power assisted steering is therefore increasingly used today.

Another important field of application for such electric motor transmission arrangements in steering systems is particularly the rotational speed superimposition device with auxiliary drive for a steering system for non-railbound motor vehicles, which superimposes the rotational speeds of the auxiliary drive and the steering intervention by the driver at the steering wheel and transmits this to the steering motion of the wheels.

Rotational speed superimposition devices of this type, to the extent that they are used for steering systems, are also referred to in the art as devices for superimposing the angle of rotation. Superimposition of the rotational speed and superimposition of the angle of rotation are synonymous.

A number of systems for forming electrical auxiliary drives with gear arrangement for use in the aforementioned arrangements are known in the art.

Rotational speed superimposition transmissions are often realized by means of planetary or worm gears. For example, the German publication DE19823721A1 discloses such a rotational speed superimposition device. Here, a steering wheel drives a housing, which accommodates the gearing of a ring gear of two planetary gear sets. An electric motor arranged in the housing drives the sun gear of the first planetary gear set. The planet carrier of the first planetary gear set drives the sun gear of the second planetary gear set. The planets of the second planetary gear set are supported on the ring gear of the housing and the planet carrier is connected to the output shaft. In the embodiment shown, the drive of the sun gear of the first planetary gear set is realized directly by the rotor of the electric motor. By controlling the electric motor accordingly, the desired superimpositions of the rotational speeds can be realized. This prior art is solution has some significant disadvantages, however. Gears of this type consist of many different components. Two ring gears or planetary gear sets are required. Producing the individual parts is highly complex and costly. The plurality of gear tooth engagements requires great accuracy. The inherently high noise of such gear systems is undesirable in this application. Moreover, the driver must rotate the entire apparatus, including the motor housing when steering. A further disadvantage is the complex electrical power coupling for the electric motor.

The prior art of DE19852447A1 proposes a solution for speed superimposition where an electric motor is coupled to a superimposed planetary gear set by a worm drive. Here, the gear unit is fixed to the vehicle body. This solution, too, has a number of drawbacks, however. The unit requires many individual parts, which are complex and costly to manufacture, and the manufacturing tolerances required are correspondingly high.

The publication WO 2006/072186 A1 proposes a rotational speed superimposition device which is already relatively compact and has fewer components. The superimposition gear unit consists of a toothed disk connected to an input shaft linked to the steering wheel and an additional toothed disk connected to the output shaft. The two toothed disks each have a different number of teeth and an additional gear meshes with the teeth of both. This gear is mounted eccentrically to a rotor and is rotatable about its own axis. The rotor is driven about the longitudinal shaft axis by an auxiliary drive. The transmission ratio can be adjusted by selecting a different number of teeth.

A drawback of all the aforementioned examples from the prior art is that their operation produces a substantial amount of undesirable noise.

SUMMARY OF THE INVENTION

The object of the present invention is to obviate at least some of the disadvantages of the prior art. Specifically, a compact assembly with a drive with transmission for a steering apparatus is to be provided which is especially characterized by low running noise and can be realized with few components that should be as simple as possible to manufacture.

According to the invention, this object is attained by the vehicle steering apparatus with a drive with a disk cam mechanism as claimed in claim 1. The dependent claims 2 to 14 relate to preferred embodiments of the vehicle steering apparatus.

A vehicle steering apparatus for a motor vehicle is proposed comprising a drive coupled to a steering gear via a disk cam mechanism having an output shaft with a longitudinal axis, the disk cam mechanism comprising:

- at least one disk cam with an undulating outer contour arranged for eccentric rotation about the longitudinal axis;
- the at least one disk cam having a circular central opening in the center;
- the at least one disk cam having at least two holes lying on a concentric reference circle between the central opening and the outer contour;
- a first carrier which is mounted to a first shaft and the axis of which lies in the longitudinal axis, with driving pins mounted to the first carrier in parallel orientation to the longitudinal axis which engage in the holes of the disk cam;
- a rotor shaft supported for rotation about the first shaft with the common longitudinal axis and the latter coupled to the drive and carrying at least one eccentric with an eccentricity in relation to the longitudinal axis, each eccentric engaging in the central opening of an associated disk cam to produce a laterally wobbling motion rotating about the longitudinal axis of the respective disk cam;
- a second carrier which is mounted to a second shaft configured as an output shaft and the axis of which lies in the longitudinal axis and is rotatable about this axis, with external pins mounted to the second carrier radially spaced in parallel orientation to the longitudinal axis, on which the undulating outer contour of the at least one disk cam rolls off by its eccentric radially wobbling motion.

The drive is preferably an electric drive.

This disk cam mechanism can be used as a reduction gear for use in an electric power assisted steering for introducing a servo force into the steering apparatus as a function of the deflection of the steering wheel or the control signal generated by the driver's input. In this embodiment, the first shaft to which the first carrier is mounted is fixed to the carrier arrangement and forms a holding shaft in such a way that it cannot rotate.

In the embodiment of the drive arrangement as a speed superimposition device in a vehicle steering apparatus, the first shaft to which the first carrier is mounted is supported in bearings for rotation about the longitudinal axis. The first carrier in this embodiment is therefore rotatable about the longitudinal axis. This first shaft is configured as an input shaft which is coupled directly or indirectly to the steering wheel to transmit rotary motion. When the steering wheel is rotated by a certain angle, this input shaft is rotated correspondingly on the disk cam mechanism and the output shaft is rotated by a desired angle, the size of which depends on the superimposed rotational speed of the electric motor. Correspondingly, a superimposition of the rotational speed or the angle of rotation occurs between the input shaft and the rotor on the one hand and the output shaft on the other. The disk cam mechanism described here is particularly well suited for use in a rotational speed superimposition device of a vehicle steering apparatus because the noise reducing effect is especially noticeable here.

Disk cam mechanisms can be configured with one or more disks. The disks are preferably identical, apart from the formation of auxiliary elements for other functions, such as lubrication, etc. They have the same undulating outer contours and the same number, arrangement and dimension of the holes. The central opening for eccentric guidance in the center of the disk is also identical in diameter and is disposed coaxially with the disk. For each disk, a separate eccentric is provided on the rotor of the drive. Thus, each disk is moved by an associated eccentric by the same lateral eccentricity but with different phase position or angular position in the direction of rotation. When two disk cams are used, two eccentrics are used, which are arranged offset by an angle of approximately 180°. When three disk cams are used, three eccentrics are used, which are mounted to the rotor offset by an angle of approximately 120° each.

To achieve additional pretensioning and/or relaxation within the gear unit the angle is often not set exactly at 180°, 120° or 360° divided by the number of disk cams. Values of up to +/−3° are typical for the deviation from the respective nominal value and are therefore referred to as "approximately."

The construction with two disk cams and two eccentrics is particularly easy to realize and is preferred because it is simple and characterized by good uniform running properties and low running noise.

Such disk cams are advantageously manufactured by precision blanking. Depending on the requirements, finish machining of the holes and the outer curve contour may even be dispensed with in part.

It is also conceivable and possible, however, to arrange the disk cams on one and the same eccentric in the form of a plurality of identical individual disk cams combined into a lamellar disk cam packet. Each of these disk cam packets then acts exactly like a single disk cam. This case is preferred to simplify manufacture, given the constraints imposed, for example, by the limited thickness of the sheet metal if precision blanking is used. In addition, noise can be reduced by corresponding tensions of the individual lamellae, the contact situation to the transmission members in engagement with the disk cams can be improved and play can be reduced.

The disk cam mechanism enables a coaxial arrangement and simple integration with an electric motor, preferably an electronically commutated electric motor, which results in a very economical and compact configuration of the entire drive unit. The external pins on which the undulating outer contour of the disk cams rolls off are preferably circular and even more preferably supported for rotation about their own axis in a plain bearing or a needle bearing, for example, in order to reduce friction.

It is conceivable and possible, however, to replace the external pins by an outer circumferential contour that replicates the surface areas of the external pins with which the undulating outer contour of the disk cams is in contact in the case of the embodiment with external pins. The other surface areas should remain free so that they do not come into contact with the undulating outer contour of the disk cams during the entire revolution of the disk cams. This alternative embodiment is advantageously used to increase stiffness, particularly if the torques to be transmitted are high.

In an advantageous further development of the invention, a safety coupling or circuit is integrated into the superimposed transmission, which forces a direct mechanical coupling between the input shaft and the output shaft if a fault occurs or in special vehicle situations—power failure, control failure or if the ignition is off, etc.—so that the driver obtains full control over the steering system. The coupling can be established very simply, e.g., by blocking the rotor of the auxiliary drive in relation to the stator or the housing of the device.

According to the proposed invention, both the superimposition device and/or the power assisted steering can be arranged between the steering gear and the steering wheel or between the steering gear and the tie rod or within the steering gear. The selection depends on the space available and on other technical and commercial considerations. If the device is arranged between the steering gear and the tie rod or within the steering gear, the output shaft will usually be linked directly to a conversion gear to convert a rotary motion into a linear motion. For example, a ball screw nut is driven directly here.

The various features of novelty which characterize the invention are pointed out with particularity in the claims annexed to and forming a part of this disclosure and are entirely based on the Swiss priority application no. 00499/07 filed Mar. 28, 2007.

BRIEF DESCRIPTION OF THE DRAWINGS

The invention will now be described in greater detail, by way of example, with reference to preferred embodiments depicted in the schematic figures, in which.

Figure 1:
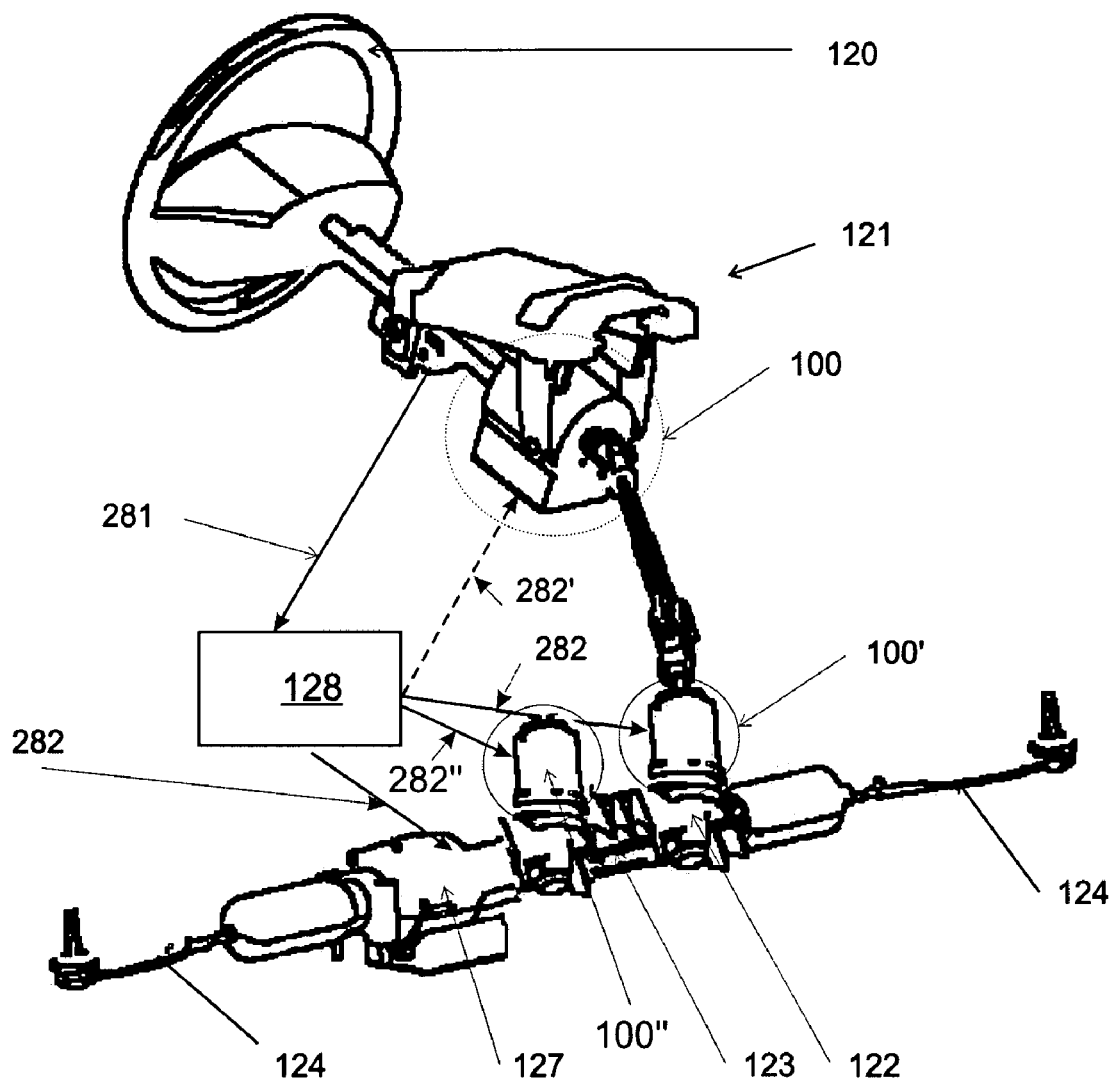
FIG. 1 is a schematic illustrating the construction of a power-assisted steering system.

The schematic construction of a steering apparatus 129 shown in FIG. 1, which is a steering apparatus 129 with electric power assist, corresponds essentially to the prior art. It comprises, among other things, a steering wheel 120, a steering column 121, the steering gear 122 and the two tie rods 124. The tie rods 124 are driven by the steering rack 123. Rotational speed superimposition is provided by the inventive superimposition device 100, 100' or 127. The superimposition device 100' can also be integrated directly into the steering gear 122. According to the invention, the device can also be used—slightly modified as shown in greater detail in FIG. 15—as an auxiliary drive 100" for an electric power assisted steering, which can also be arranged in the area of the steering gear or the steering column to couple in an assistive steering force.

Figure 2:
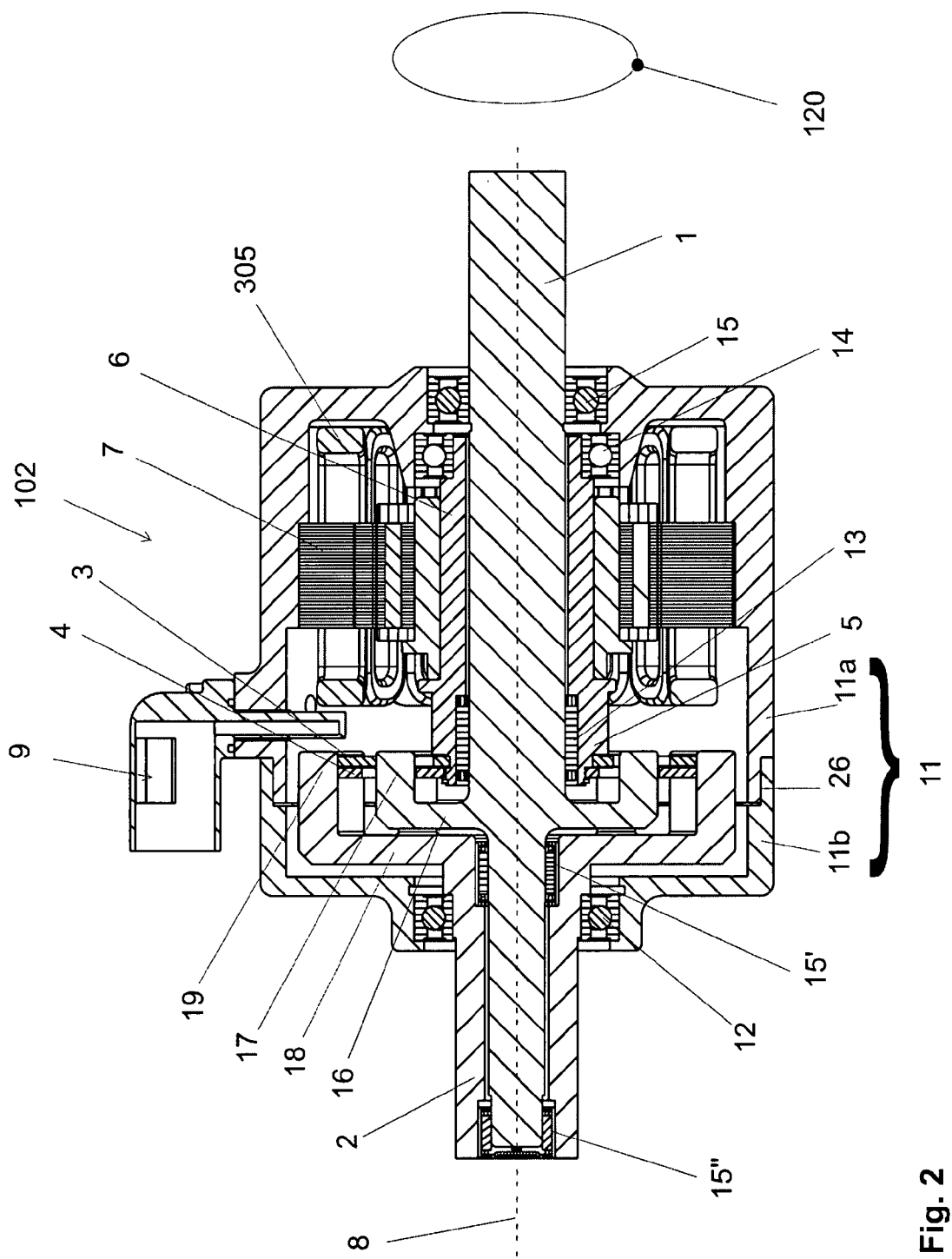
FIG. 2 is a longitudinal section of a first embodiment according to the invention of a rotational speed superimposition device with a disk cam mechanism having two disk cams, combined with an integrated electric motor, all arranged coaxially.
Figure 3:
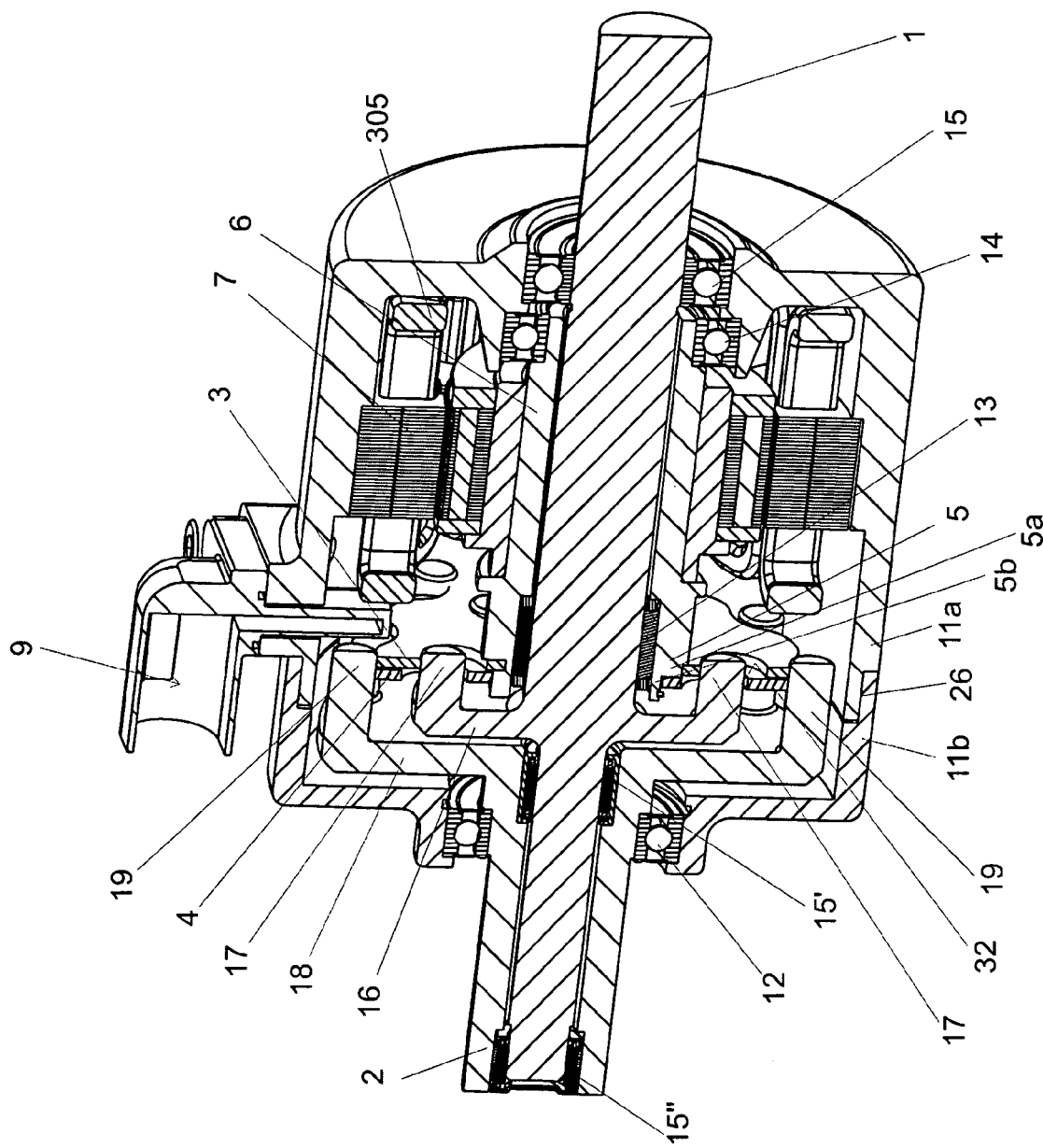
FIG. 3 is a three-dimensional view of the arrangement depicted in FIG. 2.
Figure 14:
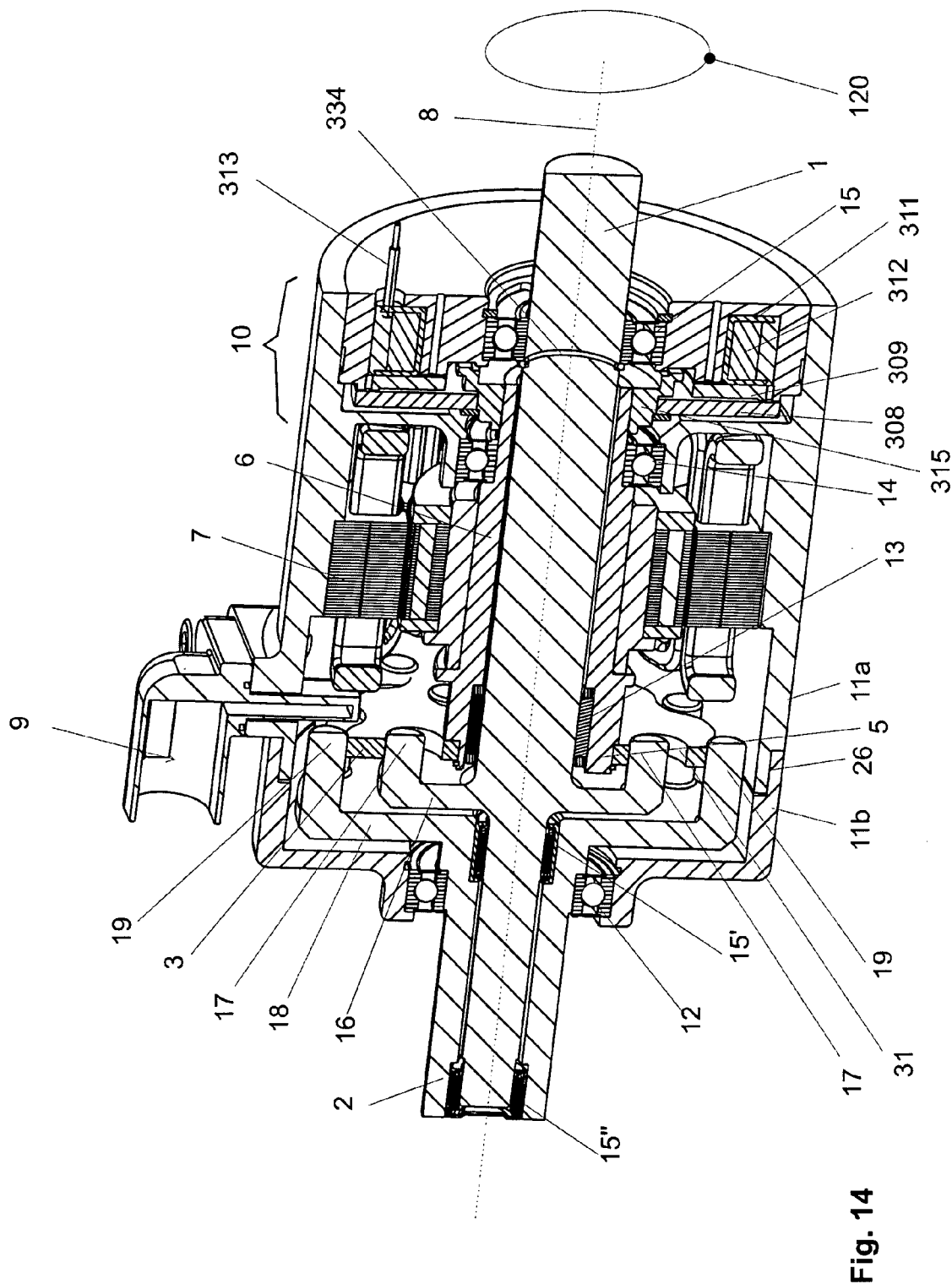
FIG. 14 shows an embodiment of the rotational speed superimposition device with a disk cam mechanism and a single disk cam with adjustable safety coupling in a longitudinal section and perspective view.

In the preferred embodiment, the superimposition device is located between the steering wheel 120 and the steering gear 122, e.g., at the point identified as 100. FIGS. 2, 3 and 14 illustrate this embodiment of the superimposition mechanism 100 in greater detail.

In another embodiment, the superimposition device is arranged between the steering gear 122 and the tie rods 124 or within the steering gear. The superimposition device 127 then includes a conversion gear for translating the rotary motion into linear motion, e.g., a ball screw or a ball screw nut.

In all the embodiments—in the standard case—the driver's input is transmitted through the steering wheel 120 via a sensor system as signal 281 to a control unit 128. The control unit 128 uses this information, possibly adding a sensor signal of the auxiliary drive of the steering system (signal line is not shown here) and/or the rotational speed superimposition unit and other signals describing the state of the vehicle to determine the corresponding control voltage 282, 282', 282" for the electric motor and outputs it to the electric motor in the superimposition device 100 or 100' and/or the auxiliary drive 100" for the electric power assisted steering.

The invention relates to an auxiliary drive 100" for the electric power assisted steering and preferably to a superimposition device 100, 100' in the arrangement in a steering system 129 for a motor vehicle. The inventive superimposition device can be used in a steering system with or without assistive power. In addition to using an inventive superimposition device it is also possible to realize an optionally present power assist of the steering system by hydraulic, pneumatic or electric means, e.g., also based on the present inventive drive concept.

The inventive drive system 100, 100', 100" for a vehicle steering apparatus comprises a drive 101, 102, preferably electric, coupled to a steering gear 122 via a disk cam mechanism 3, 4, 5, 16 to 19 with a second shaft, the output shaft 2 with the longitudinal axis 8, said disk cam mechanism comprising the following elements:

at least one disk cam 3,4 with an undulating outer contour 33, 34 mounted for eccentric rotation about the longitudinal axis 8, such that the at least one disk cam 3, 4 has a circular coaxially arranged central opening 30*a*, 30*b* in the center and the at least one disk cam 3, 4 has at least two holes 31 that lie on a concentric reference circle between the central opening 30*a*, 30*b* and the outer contour 33, 34;

a first carrier 16 mounted to a first shaft 1, 1' whose axis lies in the longitudinal axis 8, with driving pins 17 engaging in the holes 31 formed in the disk cam 3,4 mounted to the first carrier 16 in parallel orientation to the longitudinal axis;

a rotor shaft 6 coaxially mounted for rotation about the first shaft 1, 1' with the common longitudinal axis 8 and the latter connected to the drive 101, 102, carrying at least one eccentric 5*a*, 5*b* with an eccentricity 22 in relation to the longitudinal axis 8, the eccentric engaging in the central opening 30*a*, 30*b* of an associated disk cam 3, 4 to produce a laterally wobbling motion rotating about the longitudinal axis 8 of the at least one disk cam 3, 4;

a second carrier 18, which is mounted to a second shaft 2 configured as an output shaft 2 and the axis of which lies in the longitudinal axis 8 and which is rotatable about this axis, with radially spaced external pins 19 mounted to the second carrier 18 in parallel orientation to the longitudinal axis 8, on which the undulating outer contour 33, 34 of the at least one disk cam 3, 4 rolls off by the eccentric radially wobbling motion.

This driving apparatus with the disk cam mechanism can advantageously be used for both an electric power assisted steering and a rotational speed superimposition device. The arrangement is particularly well suited as a rotational speed superimposition device. The details of the invention will now be described with reference to FIGS. 2 to 15 and the different embodiments illustrated therein.

The superimposition device 100 has an input shaft 1 driven directly or indirectly by the steering wheel 120, an output shaft 2 driving the tie rods directly or indirectly, a carrier arrangement 11, an auxiliary drive, preferably an electric motor 6, 7, and a disk cam mechanism 3, 4, 5, 16, 17, 18, 19, which is mounted between the electric motor and the output shaft.

The rotational speed superimposition device shown in FIGS. 2 and 3 comprises the following components:

a driving means, here the input shaft 1 with a rotary axis 8;
a driven means, here the output shaft 2 with a rotary axis 8;
an auxiliary drive 101, 102 driving a rotor 6, with a rotary axis 8; a carrier arrangement fixed to the vehicle body, preferably configured as a housing 11, e.g., comprising the at least two housing parts 11*a* and 11*b*, which the shafts 1, 2 and the rotor 6 of the auxiliary drive in the bearings 12, 15, 15', 15" or 13, 14, such that the housing parts can preferably be screwed together by means of a thread 26;

at least one disk cam 3, 4 with an undulating outer contour 33, 34 mounted for eccentric rotation about the longitudinal axis 8, the at least one disk cam 3, 4 having a circular, coaxially disposed central opening 30a, 30b in the center, with at least two holes 31 provided on a concentric reference circle of the disks which lies between the central opening and the outer contour;

a first carrier 16 mounted rotationally fixed to the input shaft 1 and, the axis of which lies in the longitudinal axis 8 and is rotatable about this axis, with driving pins 17 mounted to the first carrier 16 in parallel orientation to the longitudinal axis 8 which engage in the holes 31 of the disk cam 3, 4 and roll or slide off the inner surfaces 32, 32';

a second carrier 18 which is mounted to a second shaft 2 configured as an output shaft 2 and the axis of which lies in the longitudinal axis 8 and which is rotatable about this axis, with external pins 19 mounted to the second carrier 18 radially spaced in parallel orientation to the longitudinal axis 8 on a reference circle concentric to the longitudinal axis, on which the undulating outer contour 33, 34 of the at least one disk cam 3, 4 rolls off by its eccentric radially wobbling motion;

such that the rotor 6 is supported for coaxial rotation about the input shaft 1 and the common longitudinal axis 8 and is operatively linked to the drive 101, 102, and the rotor 6, for each disk cam, carries an eccentric 5a, 5b associated therewith and having an eccentricity 22 in relation to the longitudinal axis 8, and the eccentric engages in the central opening 30a, 30b of the associated disk cam 3, 4 to produce a laterally wobbling motion rotating about the longitudinal axis 8 of the at least one associated disk cam 3, 4, with the input shaft and the output shaft 1, 2 preferably arranged in a single longitudinal axis with a rotational center 8. As an equivalent to the rotary transmission by means of the holes 31 and the driving pin 17 between the input shaft 1 and the disk cam 3, 3', 4 moving in a laterally wobbling motion, the rotary transmission can also be effected by an Oldham coupling or another coupling that compensates eccentricities.

Figure 4:
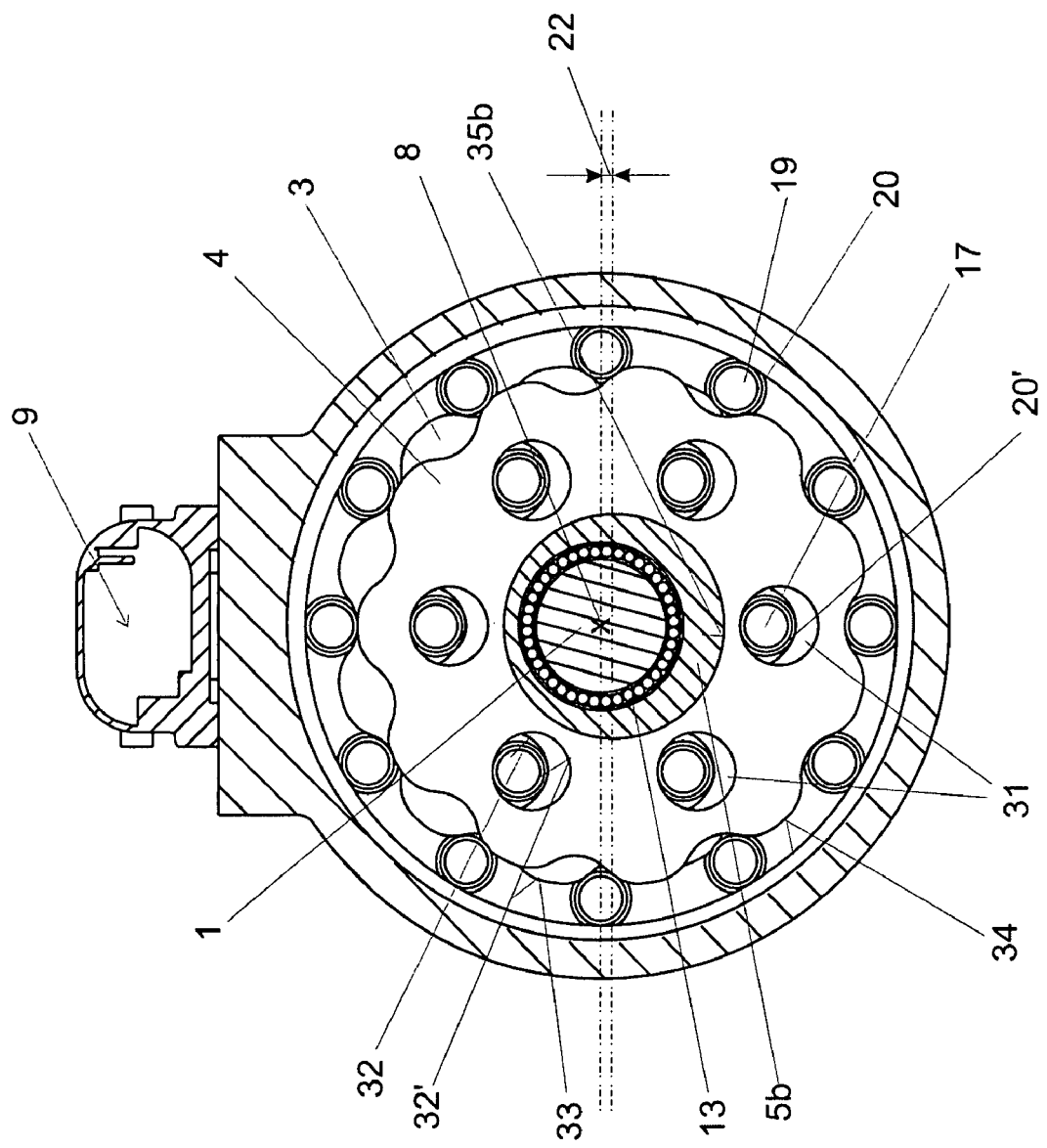
FIG. 4 is a cross section of the disk cam mechanism with two disk cams arranged in series.
Figure 15:
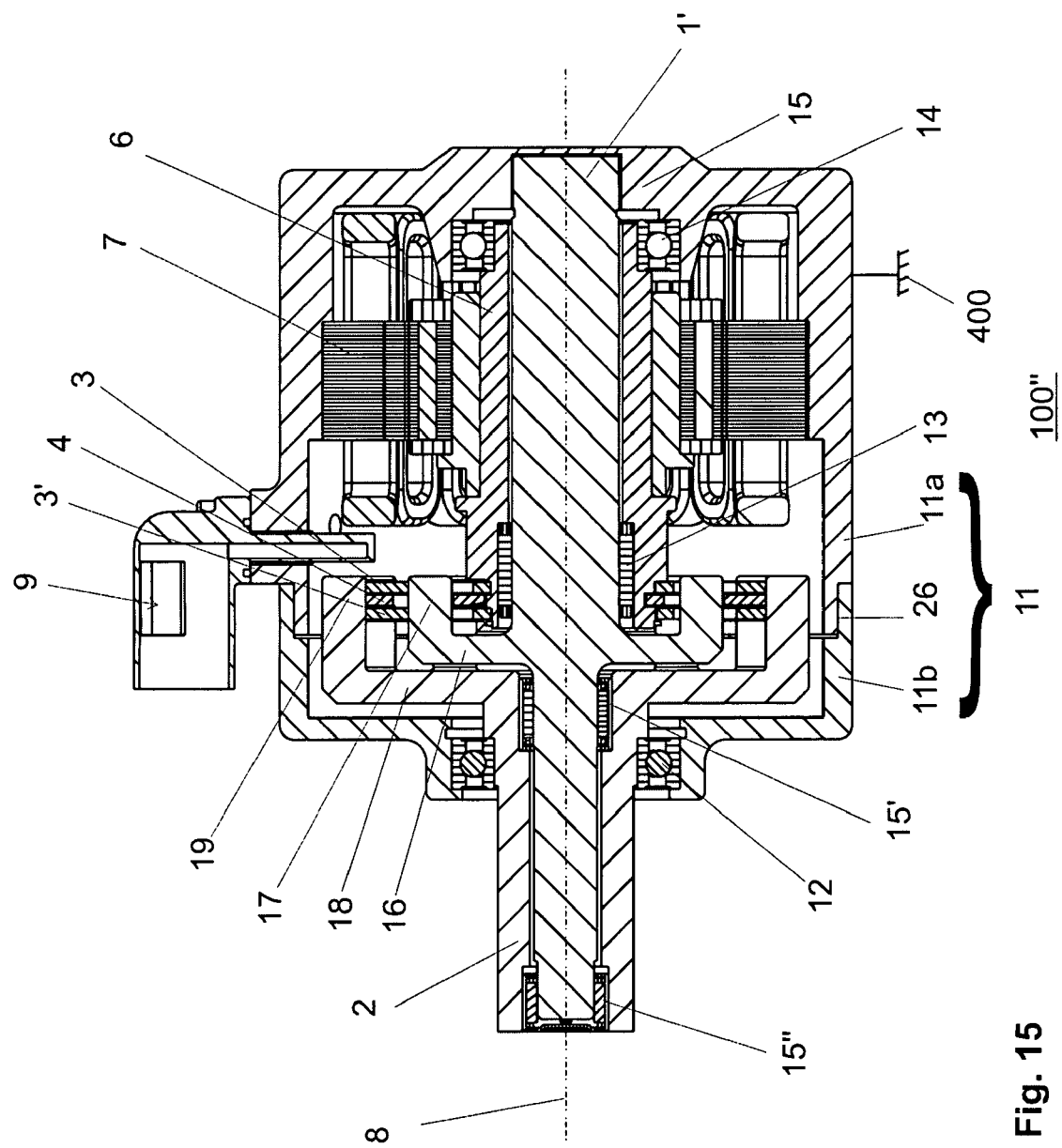
FIG. 15 is a longitudinal section of another embodiment according to the invention for electric power assisted steering with a disk cam mechanism with three disk cams, combined with an integrated electric motor, all arranged coaxially.

The disk cam mechanism can be formed by a single disk cam 3, 4 or a plurality of disk cams 3, 3', 4. The embodiment with two disk cams shown in FIGS. 2, 3 and 4 is preferred because it reduces running noise to an adequate level despite the simple design. By way of example, FIG. 14 shows an embodiment with a single disk cam 3 in a longitudinal section. FIG. 15 is a longitudinal section of an embodiment with three disk cams 3, 3', 4 in an illustration of an auxiliary drive 100" as an electric power assisted steering.

Figure 7:
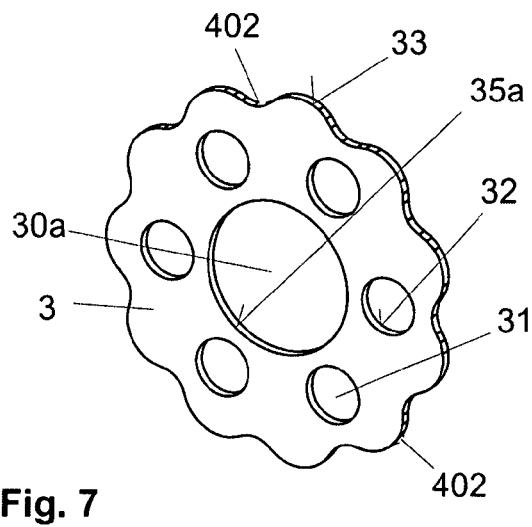
FIG. 7 is a three-dimensional detail view of a first disk cam.

FIG. 7 shows a first disk cam 3 in a slightly oblique view. The circular disk cam 3 has an undulating outer contour 33, on the surface of which the external pins 19 slide off by their eccentric and rotating motion. The undulating outer contour 33 is a series of curves forming a closed circle with periodically repeated elevations and depressions that preferably have a steady and even more preferably a steadily differentiable course. The series of curves is thus closed along its perimeter. The selected number of wave periods preferably ranges from 6 to 64 periods, with an even number being preferred. To obtain a uniform motion sequence, the outer contour can be at least partially cycloid-shaped.

Figure 8:
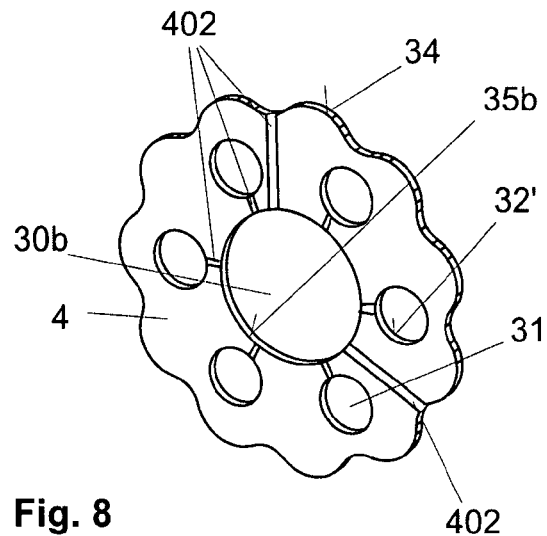
FIG. 8 is a three-dimensional detail view of a second (identical) disk cam as seen from the other side compared to the view depicted in FIG. 7.

In the center of the disk cam 3, a central opening 30a is formed coaxially with the disk center, in which engages an associated eccentric 5a mounted to the rotor 6 to produce the lateral wobbling motion by sliding or rolling off the sliding surface 35a of the central opening 30a. In addition, on a coaxial reference circle between the central opening 30a and the external surface 33, at least two holes 31 are provided in the disk cam 33. FIGS. 7 and 8 show 6 holes 31 to obtain a uniform distribution of the forces. The holes 31 are uniformly distributed around the perimeter of the reference circle. Preferably, the number of holes ranges from 4 to 24. The diameter of the holes 31 exceeds the diameter of the driving pins 17 by the eccentricity 22 of the eccentric 5a. The driving pins 17 engage in these holes 31 and slide off their sliding surfaces 32. This makes possible the rotation of the disk cam 3 about the longitudinal axis and its lateral wobbling motion.

If more than one disk cam is used, the disk cams are preferably configured identically. For illustration, a second and identically configured disk cam 4 is depicted from the rear in FIG. 8 showing the central opening 30b with its sliding surface 35b, the outer contour 34 and the holes 31 with their sliding surfaces 32'. For auxiliary functions, such as lubrication, the disk cams can be provided with grooves 402. These grooves do not need to be formed in all the disk cams used.

Figure 9:
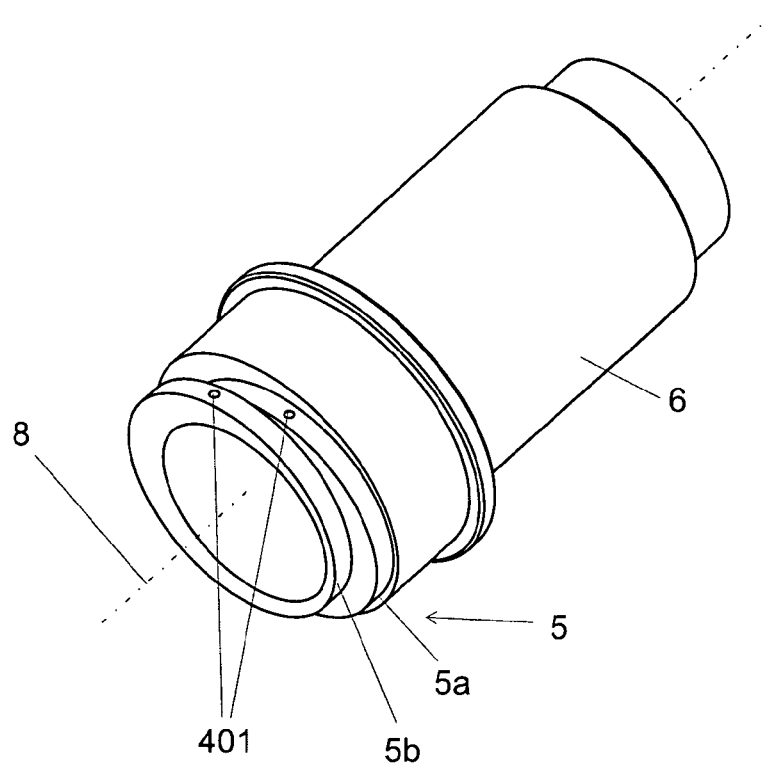
FIG. 9 shows a rotor shaft with two eccentrics that are offset by 180°.

FIG. 9 shows the rotor 6 with the eccentrics 5 in a three-dimensional view. The example shows the preferred embodiment with two eccentrics 5a, 5b, which engage in the central openings 30a, 30b of two disk cams 3, 4. Here, the eccentrics 5a, 5b are offset by 180°. If three disk cams with three eccentrics are used, the eccentrics are offset by 120°. The angle of offset is thus determined by dividing 360° by the number of disk cams used.

The shape of the eccentric 5, the eccentricity 22, the shape of the outer curve 33 and its periodicity and the external pins as well as the configuration of the holes with the driving pins are carefully adjusted to one another to obtain the desired quiet continuous running with a corresponding predefined transmission ratio. To simplify mounting of the disk cams 3, 3', 4, the individual eccentrics 5a, 5b can be made as single parts that can be separately mounted to the rotor 6.

Figure 6:
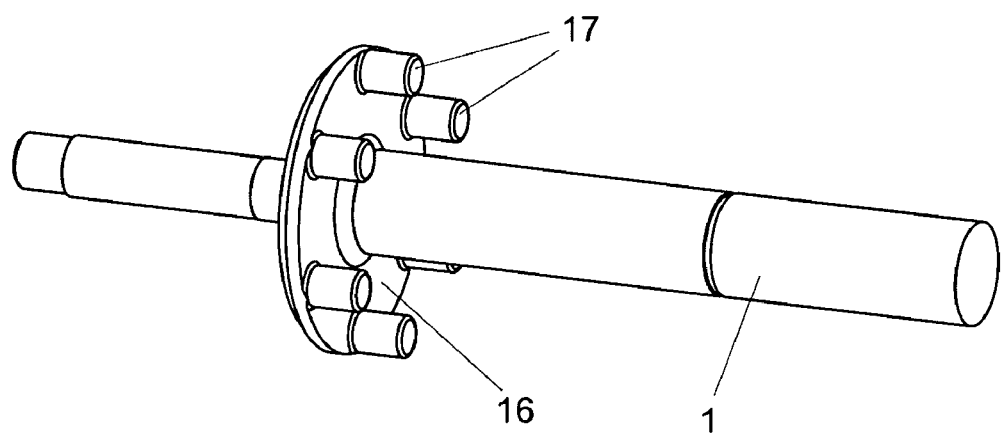
FIG. 6 is a detail view of the input shaft with the carrier for the driving pins.

A first carrier arrangement for holding the driving pins 17 is shown in FIG. 6. The input shaft 1 or the holding shaft 1', which is arranged in the longitudinal axis 8, is rotationally fixed to a disk-shaped first carrier 16. On this carrier 16, driving pins 17 are uniformly distributed on a circle at a radial distance from the input shaft. They are oriented parallel to the longitudinal axis 8 and in the assembled state engage in the holes 31 of the disk cams. If there is a plurality of disk cams 3, 4, each driving pin 17 extends through the successive holes 31 of the plurality of disks.

Figure 5:
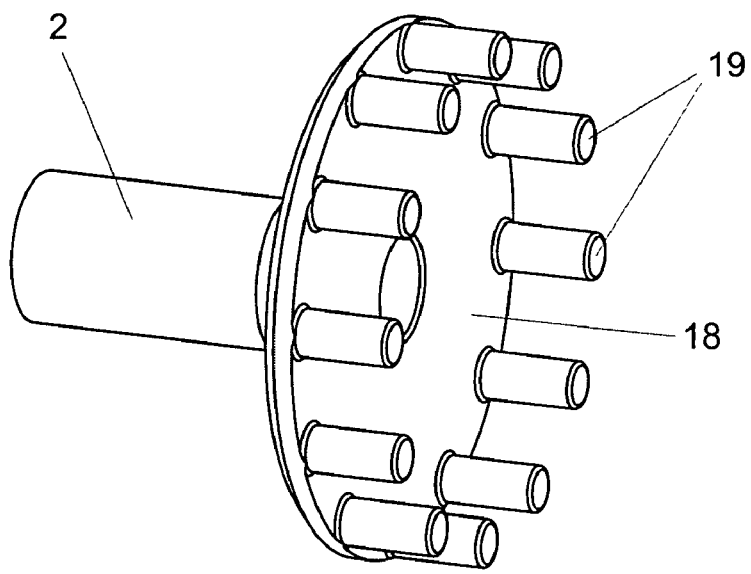
FIG. 5 is a detail view of the output shaft with the carrier for the external pins.

The second carrier arrangement for receiving the external pins 19 is illustrated in FIG. 5. The output shaft 2, which is disposed in the longitudinal axis 8, is rotationally fixed to a disk-shaped second carrier 18. On this carrier 18, external pins 19 are uniformly distributed on a circle at a radial distance from the input shaft. They are oriented parallel to the longitudinal axis 8 and overlap the outer contour 33 of the disk cam. If there is a plurality of disk cams 3, 4, each external pin 19 overlaps the successive outer contours 33, 34 of the disk cams 3, 4. In this case, the wave trains of the outer contours 33, 34 are offset relative to one another within the bounds of the moving eccentricity but are always contacting and sliding off the external pins 19, such that these external pins 19 and thus the output shaft are driven at a correspondingly geared-down speed.

The external pins 19 and/or the driving pins 17 can either be formed as a plain bearing component or, preferably, contain rolling bearings. The eccentric(s) can also be provided with a plain bearing or, preferably, with a rolling bearing. If space is limited, however, it may be necessary to provide only sliding contacts without special bearings. The preferred embodiment of a disk cam mechanism with two disk cams 3, 4 is depicted in a cross sectional view in FIG. 4. The first shaft, the input shaft 1 with the rotary axis 8 located in the center is supported for rotation about this axis on the carrier arrangement 11, which is fixed to the chassis. A bearing 13 supporting the rotor 6 for rotational movement is located coaxially over the input shaft 1. Two eccentrics 5a, 5b are mounted to this rotor 6, preferably at one end of the rotor shaft piece. In the cross-sectional view of FIG. 4, the second eccentric 5b can be seen engaging in the central opening 30a, 30b of the associated second disk cam 4 where it slides or rolls off the inner surface 35a, 35b of the disk cam. The first eccentric 5a with the first disk cam 3 is located directly behind the second eccentric 5b and is therefore not visible in FIG. 4. The two eccentrics 5a, 5b are fixed to the rotor 6 so as to be offset by 180° in the direction of rotation. The eccentrics 5a, 5b are preferably configured as circular disks that are disposed eccentrically by their eccentricity 22. The two disk cams 3, 4 with the associated outer contours 33, 34 and the circularly arranged holes 31 between the central openings and the outer contours are laterally offset by the eccentricity in relation to the central axis 8 corresponding to the position of the two eccentrics 5a, 5b. The driving pins 17 extend through the holes 31 in the disk cams and slide off the inner surfaces 32, 32' of the holes 31 during rotation about the longitudinal axis 8 and/or by the eccentric motion of the disk cams 3, 4. Thus, a driving pin 17 extends through a hole 31 of the first disk cam 3 and at the same time through a hole 17 of the second disk cam 4 located behind it. The diameter of the holes 31 exceeds the diameter of the driving pins 17 by the eccentricity 22 to ensure the continuous eccentric running and offset of the disk cams 3, 4. Pin bearings 32, 32' rolling on the driving pins are preferably provided, which roll off the sliding surfaces 32, 32' of the holes during the eccentric motion to further reduce the frictional forces.

Due to the eccentric motion of the disk cams 3, 4, the wave trains of the outer contours 33, 34 of the two disk cams 3, 4 slide or roll off the external pins 19, which are arranged crown-like around them. The external pins 19 are uniformly distributed on a reference circle about the rotational center 8 on the second carrier 18, which is rotationally fixed to the output shaft 2. The radial distance of the external pins 19 from the rotational axis 8, or the reference circle diameter, is selected such that the outer contours 33, 34 of the disk cams 3, 4 always contact the pins 17 during eccentric rotational motion. Here, too, the pins 17 may be configured as plain bearings or, preferably, provided with rolling bearings 20, 20'. The number of periods of the wave train, i.e., the elevations alternating with the depressions, of the outer contour 33, 34 of the disk cams 3, 4 is smaller by one than the number of the external pins 19. In the example shown in FIG. 4, the wave train of the two disk cams has eleven periods while the second carrier 18 has twelve external pins 19. The number of periods of the outer contour 33, 34 of the disk cams 3, 4 determines the transmission ratio of the disk cam mechanism. In the example depicted here, the rotor shaft 6 with the eccentrics 5a, 5b must be rotated eleven times to achieve one rotation on the output shaft 2. The transmission ratio in this case is therefore 1:11. For the use of the proposed disk cam mechanism in a vehicle steering apparatus, it is advantageous to provide transmission ratios ranging from 1:11 to 1:64.

Figure 11:
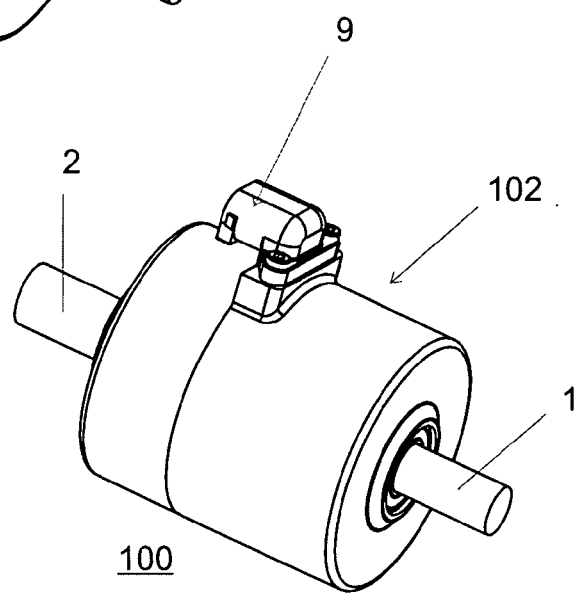
FIG. 11 is a three-dimensional representation of a superimposition mechanism with an electric motor drive arranged coaxially within the housing, corresponding to the embodiment shown in FIGS. 2 and 3.

In a much preferred embodiment of the rotational speed superimposition device 100, an electric motor drive 102 is integrated into the carrier arrangement 11 or into a housing 11a, 11b as shown in FIGS. 2, 3 and 11. The electric motor 102 is preferably an electronically commutated motor that is positioned coaxially around the longitudinal axis 8 of the arrangement. The rotor 6, which is supported in bearings 13, 14 for rotation coaxial with the input shaft 1, simultaneously forms the rotor 6 of the electric motor 102 on which permanent magnets are disposed. A stator 7 with stator windings 305, which is fixed to the housing, surrounds the rotor 6. On the housing 11 of the arrangement, connectors 9 are provided for connection of the power supply of the motor and, optionally, transmission of measurement signals, e.g., one or more of the rotational speeds of the input shaft 1, the output shaft 2 and/or the rotor 6 and/or angle of rotation adjustment. The signals can then be transmitted to the control unit 128, which uses them to control the auxiliary drive or other components in the vehicle not depicted here, such as the antilock braking system. This integrated motor arrangement, combined with the disk cam mechanism, can be made particularly simple and compact with good efficiency and low noise characteristics. A further advantage of the arrangement in its preferred embodiment is that it does not turn along with the steering wheel 120, and the carrier arrangement 11 or the housing 11 is fixed to the chassis 400 of the vehicle.

Another important advantage of the solution according to the invention is that the carrier arrangement 11a, 11b or the housing 11 assumes only a supporting function for the mechanism members and is not itself one of the mechanism members. Consequently, no momentums are transmitted directly to the housing through the contact of the mechanism members during the change in engagement. Furthermore, it is readily possible to form the housing 11 of a sound absorbing material, e.g., several layers of sheet metal and/or plastic. Correspondingly, the housing may be fixed to the chassis 400 using sound-absorbing intermediate members (e.g., rubber bearings).

The same advantages can also be achieved in the embodiment of the invention in which the drive system 100'' is used as an electric power assist means and the input shaft 1 is designed as the holding shaft 1', if the latter is rotationally fixed to the housing 11 or a part of the carrier arrangement 11a, 11b, as illustrated in FIG. 15.

Although the integrated design of the motor drive 102 combined with the disk cam mechanism is preferred, the operation with an externally mounted drive 101 may make sense in certain cases.

Figure 10:
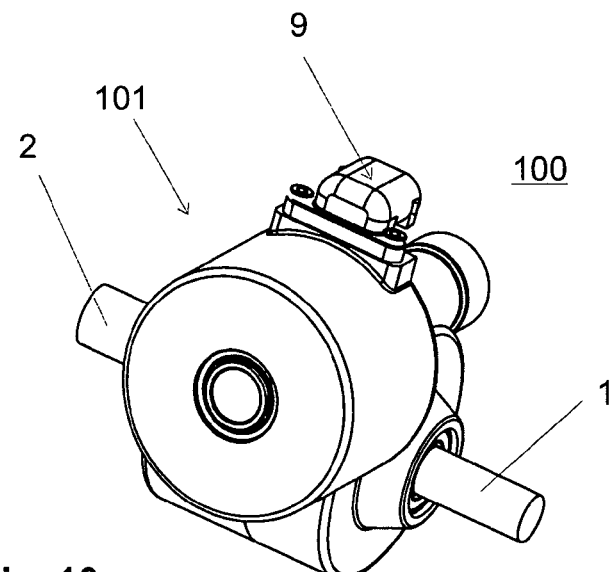
FIG. 10 is a three-dimensional representation of a superimposition mechanism with an externally mounted motor and an additional worm gear.
Figure 12:
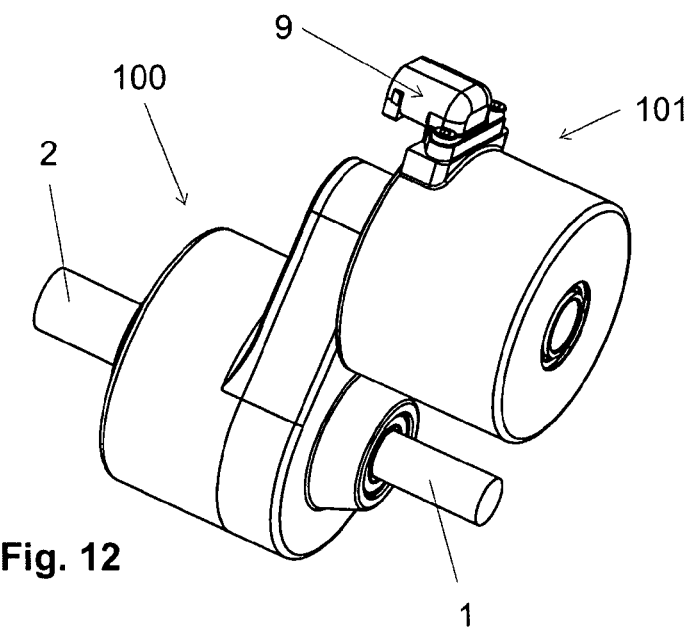
FIG. 12 is a three-dimensional representation of a superimposition mechanism with externally mounted motor and transmission drive.

One possibility, for example, is that the auxiliary drive has an additional gear with transmission means, such as a belt or chain drive or, in a particular case, a gearwheel drive, and drives the rotor 6 of the rotational speed superimposition device using wheels, as illustrated in FIG. 12. The drive 101 can again be externally coupled to the housing 11 as described above. The driving wheel on drive 101 preferably has a smaller diameter than the cylindrical gear which is rotationally fixed to the rotor 6 to provide an additional gear ratio upstream of the disk cam mechanism. It is good to use belts for this drive, preferably toothed belts for additional noise decoupling. Instead of gears with transmission means it is also possible to add a worm gear between the external drive 101 and the disk cam mechanism, as indicated in FIG. 10.

In the above-described arrangements of the disk cam mechanism with a drive motor 101 externally mounted to the housing 11, it is also possible, instead of the preferred embodiment as an electronically commutated electric motor, to design the drive very simply as a hydraulic or pneumatic drive since the carrier arrangement 11 or the housing 11 is fixed to the vehicle body, although in that case it is no longer possible to achieve all of the aforementioned advantages.

Figure 13:
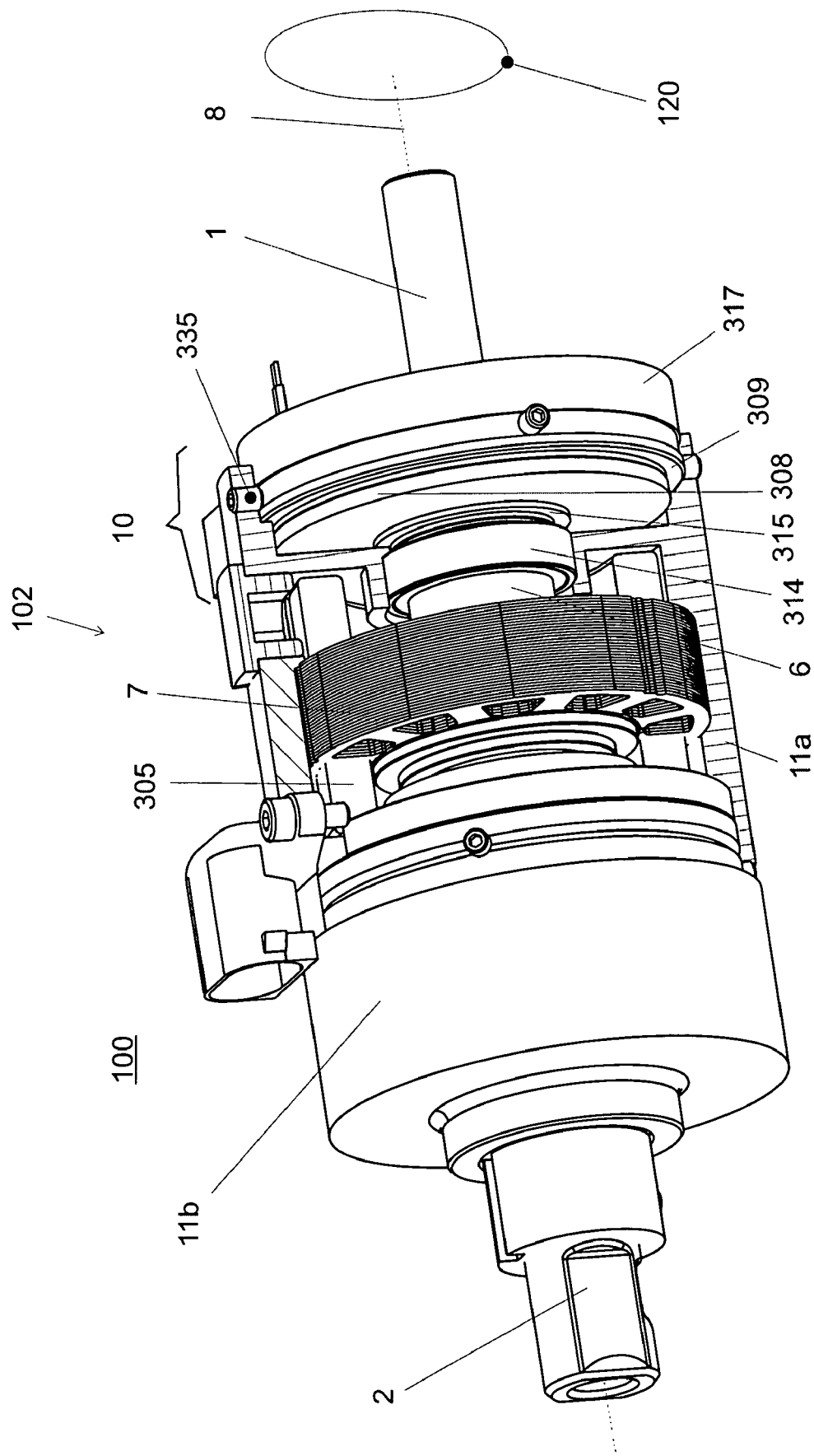
FIG. 13 is a perspective view of an embodiment of the rotational speed superimposition device with adjustable safety coupling.

Another preferred embodiment of the rotational speed superimposition device comprises, in addition, a safety coupling 10 or a locking device, particularly in the embodiment with integrated electric motor 102 as an auxiliary drive as illustrated in FIGS. 13 and 14.

In the embodiment shown, the safety coupling 10 has a very simple design. Because of the construction of the rotational speed superimposition device, a simple locking of the housing 11 with the rotor 6 of the auxiliary drive 102 is sufficient to fully couple the rotational speed of the steering wheel 120 with the rotational speed of the output shaft 2 to ensure that the driver has full control over the steering system, even if a fault occurs. In the simplest case, locking is provided by a pin (not depicted in the figures) which engages in corresponding recesses on the rotor 6. Due to the transmission ratio of the speed of the output shaft to the speed of the rotor, the loads acting on the locking device are not very great, so that the lock can even be established by frictional locking between two contact members 308, 309, e.g. disks, which are moved toward each other if a fault occurs. One of the contact members 308 is connected to the rotor 6 via a coupling element 315 and the other contact member 309 is rotationally fixed in relation to the housing 11. The locking device can be compactly arranged in another partial housing 317 axially to the superimposition device 100 and can be fixed directly adjacent to the electric motor drive 102, for example, with the aid of fastening means 335, such as screwed connections.

As an alternative, this locking device can also be arranged in the externally mounted auxiliary drive 101 or on the transmission gear between the externally mounted auxiliary drive 101 and the superimposition mechanism.

Another advantageous embodiment of a compact rotational speed superimposition device with disk cam mechanism and integrated electric motor combined with an electromagnetically actuated adjustable locking device is depicted in detail in the longitudinal section of FIG. 14. The locking device 10 serves for the optional rotationally fixed coupling between the output shaft 2 and the input shaft 1. The carrier arrangement 8 is rotationally fixed in relation to the vehicle body 400. The rotor of the auxiliary drive 305, 6, 7 coaxially encloses the input shaft 1 and is non-rotatably connected to a ferromagnetic or permanent magnetic first contact member 308. The non-rotatable coupling between the output shaft 2 and the input shaft 1 by frictional locking of the first contact member 308, which is non-rotatably connected to the rotor 6 and a second contact member 309, which is non-rotatably connected to the carrier arrangement 8, is achieved by pressing the two members together. The closing force required for frictional locking is generated by a magnetic force, where one of the two contact members 308, 309 is displaceable in axial direction.

Advantageously, in all the embodiments, one and/or both contact members can alternatively be disks and/or elements with surface sections formed with corresponding conical or curved surfaces. This increases the contact area while keeping the diameter the same. A centering function can be achieved in addition.

In the simplest case, the magnetic closing force is generated by a permanent magnet 311. The permanent magnet 311 can be a cylindrical disk whose axis coincides with the axis 8 of the input shaft 1 or the output shaft 2. However, a plurality of individual permanent magnets can also be applied to a cylindrical disk. For the sake of simplicity, every possible embodiment is hereinafter referred to as the permanent magnet 311.

In locked condition, the contact members 308, 309 are in frictional contact with each other, so that the rotor 6 is blocked in relation to the carrier structure 8. The rotor 6 is moreover connected to the disk cam mechanism, which is therefore also blocked in relation to the carrier structure 8, which is rotationally fixed in relation to the vehicle body. Thus, the full torque applied to the input shaft 1 is transmitted to the output shaft 2. Correspondingly, the rotational speed of the input shaft 1 is transmitted to a rotational speed on the output shaft 2. This achieves the function of the rotationally fixed coupling between the input shaft 1 and the output shaft 4. This is important in an emergency or if the drive motor of the vehicle is switched off. In this operating condition, the driver has sole control over the steering of the direction of motion, and the steering wheel is mechanically coupled to the pivoted wheel. This is important if there is no power supply to the auxiliary drive, e.g., in the event of a power failure, or if the control of the auxiliary drive malfunctions. To detect such malfunctions, sensors may for example be integrated into the rotational speed superimposition device to monitor the different rotational speeds or angles of rotation of the input shaft 1, the output shaft 2 and the rotor 6.

In unlocked condition, where the rotational speeds or the angles of rotation of the input shaft 1 and the output shaft 2 are to be changeable in relation to each other, the contact members 308, 309 are preferably frictionally disengaged by a small distance relative to each other. At the same time, the auxiliary drive is supplied with power, so that it assumes the support of the torque applied by the input shaft 1. If needed, the rotor 6 is set into rotation by the auxiliary drive to achieve the corresponding superimposition of the rotational speed or the angle of rotation between the input shaft 1 and the output shaft 2. Unlocking is preferably effected by a flow of current; in the absence of this flow of current the system locks automatically. This is achieved in that the magnetic contact pressure between the first and the second contact member can be canceled by an electrically controlled counter magnetic field. In the simplest case, this counter magnetic field is generated by a rotating coil 312 controlled by an electrical connection 313. In the example shown, the coil 312 is arranged between the permanent magnet 311, which generates the magnetic contact force, and the contact disk 309. If a current flows through the coil 312, the magnetic circuit between the permanent magnets 311 closes, so that no attractive force acts on the first contact disk 308, or only a very minor attractive force acts in the direction of the second contact disk 309. As a result, the frictional force between the two contact disks representing the contact members in this example decreases so that the locking device 310 is unlocked. If the power supply to the coil 312 is interrupted, the counter magnetic field collapses immediately, so that the magnetic force of the permanent magnets 311 acts directly on contact disk 308 and pulls it toward contact disk 309. The pressure of a concentrically disposed spring 334 shown in FIG. 14 preferably supports the opening of the coupling, so that less energy is required to hold the coupling open.

In a further development of the invention, lubrication of the gears is provided. To this end, radial holes 401 are formed in the eccentrics 5a, 5b for the transport of a lubricant. This supplies the contact surfaces 35a, 35b of the central opening 30a, 30b and the external surfaces of the eccentrics 5a, 5b and, if present, the rolling elements therebetween with lubricant. It is conceivable and possible to provide single or several lubrication grooves 402 in the disk cams or their surface to supply even the outlying gear contacts with lubricant. This can be done in a particularly simple and cost effective manner if the disk cams are formed of packets combined in lamellar fashion.

It is obvious that the individual features presented in the various embodiments of the invention, e.g., the embodiment:
- with one, two, three, or more disk cams,
- with or without safety coupling,
- the embodiment as an auxiliary drive or as a superimposition device for the vehicle steering apparatus, can be freely combined with each other.

What is claimed is:

1. A vehicle steering apparatus for a motor vehicle having a drive (101, 102), which is coupled to a steering gear (122) via a disk cam mechanism (3, 4, 5, 16, 17, 18, 19) with an output shaft (2) with the longitudinal axis (8), wherein the disk cam mechanism comprises:
   at least one disk cam (3, 4) with an undulating outer contour (33, 34) disposed for eccentric rotation about the longitudinal axis (8);
   the at least one disk cam (3, 4) having a circular central opening (30a, 30b) in its center;
   the at least one disk cam (3, 4) having at least two holes (31) lying on a concentric reference circle between the central opening (30a, 30b) and the outer contour (33, 34);
   a first carrier (16) which is arranged on a first shaft (1,1') and the axis of which lies in the longitudinal axis (8), with driving pins (17) mounted to the first carrier (16) in parallel orientation to the longitudinal axis (8), which engage in holes (31) of the disk cam (3, 4);
   a rotor shaft (6), which is supported in a carrier arrangement (11, 11a, 11b) and on the first shaft (1, 1') for coaxial rotation about the first shaft (1, 1') with the common longitudinal axis (8) and the latter is coupled to the drive (101,102) and carries at least one eccentric (5a, 5b) with an eccentricity (22) in relation to the longitudinal axis (8), wherein each eccentric (5, 5b) engages in the central opening (30a, 30b) of an associated disk cam (3, 4) to produce a laterally wobbling motion rotating about the longitudinal axis (8) of the respective disk cam (3, 4);
   a second carrier (18) mounted to a second shaft (2), which is configured as an output shaft (2) rotatably supported in the carrier arrangement (11, 11a, 11b) for rotation about the longitudinal axis (8), wherein external pins (19) are mounted to the second carrier (18) radially spaced in parallel orientation to the longitudinal axis (8), on which the undulating contour (33, 34) of the at least one disk cam (3, 4) rolls off by the eccentric radially wobbling motion.

2. A vehicle steering apparatus as claimed in claim 1, characterized in that all the disk cams (3, 4) have the same undulating outer contour (33, 34) with the same diameter and the same number of holes (31) with the same arrangement and that the driving pins (17) on the first carrier (16) each extend through these holes (31) of all the disks (3, 4).

3. A vehicle steering apparatus as claimed in claim 1, characterized in that if a plurality of disk cams (3, 3', 4) are used, their outer contours (33, 34) with wavelike elevations and depressions are offset relative to one another, such that the outer contours (33, 34) of all the disk cams (3, 4) contact the external pins (19) rolling off them.

4. A vehicle steering apparatus as claimed in claim 1, characterized in that for each disk cam (3, 3', 4) there is an associated eccentric (5a, 5b) and the latter are mounted to the rotor (6) so as to be rotated by an angle whose value is approximately 360° divided by the number of eccentrics (5a, 5b) or the number of disk cams (3, 3', 4) used.

5. A vehicle steering apparatus as claimed in claim 1, characterized in that the external pins (19) and/or the driving pins (17) on their surface are formed as a plain bearing component.

6. A vehicle steering apparatus as claimed in claim 1, characterized in that the external pins (19) and/or the driving pins (17) carry rolling bearings.

7. A vehicle steering apparatus as claimed in claim 1, characterized in that the undulating outer contour (33, 34) is at least partly cycloid-shaped.

8. A vehicle steering apparatus as claimed in claim 1, characterized in that the disk cam mechanism has exactly two disk cams (3, 4).

9. A vehicle steering apparatus as claimed in claim 1, characterized in that the drive (102) is disposed coaxially with the longitudinal axis (8) and forms a unit together with the disk cam mechanism and the carrier arrangement (11).

10. A vehicle steering apparatus as claimed in claim 9, characterized in that the rotor (6) is configured as the rotor of the electric drive (102) and that the drive (102) is an electronically commutated electric motor.

11. A vehicle steering apparatus as claimed in claim 1, characterized in that the carrier arrangement (11a, 11b) is configured as a housing (11).

12. A vehicle steering apparatus as claimed in claim 1, characterized in that the rotor (6) can be blocked with a safety brake (10) in relation to the carrier arrangement (11).

13. A vehicle steering apparatus as claimed in claim 1, characterized in that the first shaft (1) is supported in bearings (15, 15') on the carrier arrangement (11) for rotation about the longitudinal axis and is configured as an input shaft (1) which is connected to a steering wheel (120), and the disk cam mechanism together with the drive (101, 102) forms a speed superimposition device.

14. A vehicle steering apparatus as claimed in claim 1, characterized in that the first shaft (1') is non-rotatably fixed to the carrier arrangement (11), the carrier arrangement (11) is fixed to a chassis of the motor vehicle, and the disk cam mechanism together with the drive (101, 102) forms an electric power assisted steering.

* * * * *